(12) United States Patent
Muendel (10) Patent No.: US 8,908,263 B2
(45) Date of Patent: Dec. 9, 2014

(54) LARGE MODE AREA OPTICAL WAVEGUIDE DEVICES

(75) Inventor: Martin H. Muendel, Oakland, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 211 days.

(21) Appl. No.: 13/495,941

(22) Filed: Jun. 13, 2012

(65) Prior Publication Data
US 2012/0320451 A1    Dec. 20, 2012

Related U.S. Application Data

(60) Provisional application No. 61/498,463, filed on Jun. 17, 2011.

(51) Int. Cl.
| | |
|---|---|
| H04B 10/17 | (2006.01) |
| H01S 3/094 | (2006.01) |
| H01S 3/16 | (2006.01) |
| H01S 3/067 | (2006.01) |
| H01S 3/17 | (2006.01) |
| H01S 3/0941 | (2006.01) |

(52) U.S. Cl.
CPC ....... H01S 3/094007 (2013.01); H01S 3/06733 (2013.01); H01S 3/06716 (2013.01); H01S 3/06745 (2013.01); H01S 3/06754 (2013.01); H01S 3/176 (2013.01); H01S 3/09415 (2013.01); H01S 3/1611 (2013.01)
USPC ...................................... 359/341.1; 359/341.5

(58) Field of Classification Search
CPC .................... G02B 6/03638; G02B 6/02009
USPC ............................................ 359/341.1, 341.5
See application file for complete search history.

(56) References Cited

U.S. PATENT DOCUMENTS

| | | | | |
|---|---|---|---|---|
| 3,729,690 | A | * | 4/1973 | Snitzer ............................. 372/40 |
| 4,815,079 | A | | 3/1989 | Snitzer et al. ..................... 372/6 |
| 4,964,131 | A | * | 10/1990 | Liu et al. .......................... 372/6 |
| 5,533,163 | A | | 7/1996 | Muendel ........................ 385/126 |
| 6,157,763 | A | | 12/2000 | Grubb et al. ................... 385/126 |
| 6,324,326 | B1 | * | 11/2001 | Dejneka et al. ............... 385/123 |
| 7,424,193 | B2 | | 9/2008 | Galvanauskas ............... 385/123 |
| 7,570,856 | B1 | * | 8/2009 | Minelly et al. ................ 385/126 |
| 7,787,729 | B2 | | 8/2010 | Dong et al. .................... 385/123 |

OTHER PUBLICATIONS

Glas et al. "Cladding pumped large-mode-area Nd-doped holey fiber laser", Optics Express, vol. 10, No. 6, pp. 286-290 (2002).*
Koponen et al. "Combined Photodarkening and Thermal Bleaching Measurement of an Ytterbium-Doped Fiber", Proc. SPIE, vol. 7195, p. 7195D-1 to 7195D-7, 2009.

(Continued)

*Primary Examiner* — Eric Bolda
(74) *Attorney, Agent, or Firm* — JDS Uniphase Corporation (57) ABSTRACT

A very large more area active double clad optical waveguide doped with $Nd^{3+}$ at a concentration of at least 0.1% by weight can be used to effectively amplify light at a wavelength of between 1050 nm and 1120 nm. At a doping concentration sufficient to provide a net optical absorption of at least 3 dB/m for the pump light at the wavelength of 795 to 815 nm or 883 to 887 nm, $Nd^{3+}$ operates under much lower inversion levels than $Yb^{3+}$. Due to the lower inversion levels, the $Nd^{3+}$ doped waveguide is subject to reduced pump bleaching or photodarkening.

15 Claims, 5 Drawing Sheets

(56) References Cited

OTHER PUBLICATIONS

Limpert et al. "High-Power Rod-Type Photonic Crystal Fiber Laser", published in Optics Express, vol. 13, No. 4, Feb. 21, 2005, p. 1055-1058.

Limpert et al. "High Repetition Rate Gigawatt Peak Power Fiber Laser Systems: Challenges, Design, and Experiment", IEEE J. Selected Topics in Quantum Electronics, vol. 15, Jan./Feb. 2009, p. 159-169.

Injeyan, Hagop, Ph.D., Goodno, Gregory D., Ph.D., High-Power Laser Handbook, (2011).

Swiderski, J., et al., "Rare-earth-doped high-power fiber lasers generating in near infrared range," Opto-Electronics Review 12(2), 160-173 (2004).

Fiber Lasers: Fiber Lasers: The State of the Art, LaserFocusWorld, by Jeff Hecht, Apr. 1, 2012.

\* cited by examiner

FIG. 1

*Prior Art*

LARGE MODE AREA OPTICAL WAVEGUIDE DEVICES

CROSS-REFERENCE TO RELATED APPLICATIONS

The present invention claims priority from U.S. Patent Application No. 61/498,463 filed Jun. 17, 2011, which is incorporated herein by reference for all purposes.

TECHNICAL FIELD

The present invention relates to active optical waveguide devices, and in particular to amplifiers and oscillators using large mode area (LMA) active optical waveguides.

BACKGROUND OF THE INVENTION

Fiber lasers and amplifiers have a number of advantages over free-space lasers and amplifiers. In fiber lasers and amplifiers, the light is guided by an "active" fiber core doped with a material that provides optical gain, which makes fiber lasers and amplifiers insensitive to mechanical misalignment. The light guiding property of the active optical fiber also allows one to increase the length of the gain medium to tens and even hundreds of meters, resulting in very high achievable optical gains.

There is currently great interest in double-clad fiber lasers and amplifiers and related waveguide devices, thanks to their very high efficiency, brightness, compactness, and cost-effectiveness. Snitzer et al. in U.S. Pat. No. 4,815,079 and Grubb et al. in U.S. Pat. No. 6,157,763 disclose double-cladding optical fiber structures enabling multimode pump radiation from laser diodes to be coupled efficiently into rare-earth-doped single mode cores of optical fibers.

As mentioned in the Snitzer patent, useful glass dopant materials for the double-clad configuration can include neodymium ions ($Nd^{3+}$) and ytterbium ions ($Yb^{3+}$), which are superficially similar in that they both amplify light at wavelengths around 1060 nm, and they can both be pumped by near-infrared GaAs laser diodes. In the early 1990's, experiments were done using double-clad $Nd^{3+}$ lasers, in part because of the availability of laser diodes at the 805 nm pump wavelength of $Nd^{3+}$ that were developed for pumping Nd:YAG crystal lasers. In the late 1990's, highly reliable laser diodes in the 900-980 nm range became widely available as pumps for telecommunications optical amplifiers. Since this range covers the $Yb^{3+}$ pump bands, it became practical to use $Yb^{3+}$ rather than $Nd^{3+}$ as the lasing dopant in double-clad lasers for operation at the wavelength of about 1060 nm.

$Yb^{3+}$ has rapidly become the preferred dopant over $Nd^{3+}$ for operation at 1060 nm because of the following advantages known to the person skilled in the art:

(a) $Yb^{3+}$ can amplify light more efficiently than $Nd^{3+}$, because the energy loss between photons at the pump and the output wavelengths is smaller. By way of example, $Yb^{3+}$ in silica fibers can be pumped at up to 980 nm and amplify light at wavelengths as low as 1030 nm, resulting in a quantum yield of 95%, whereas $Nd^{3+}$ is typically pumped at 805 nm amplifying light at 1060 nm, resulting in a quantum yield of only 75%.

Figure 1:
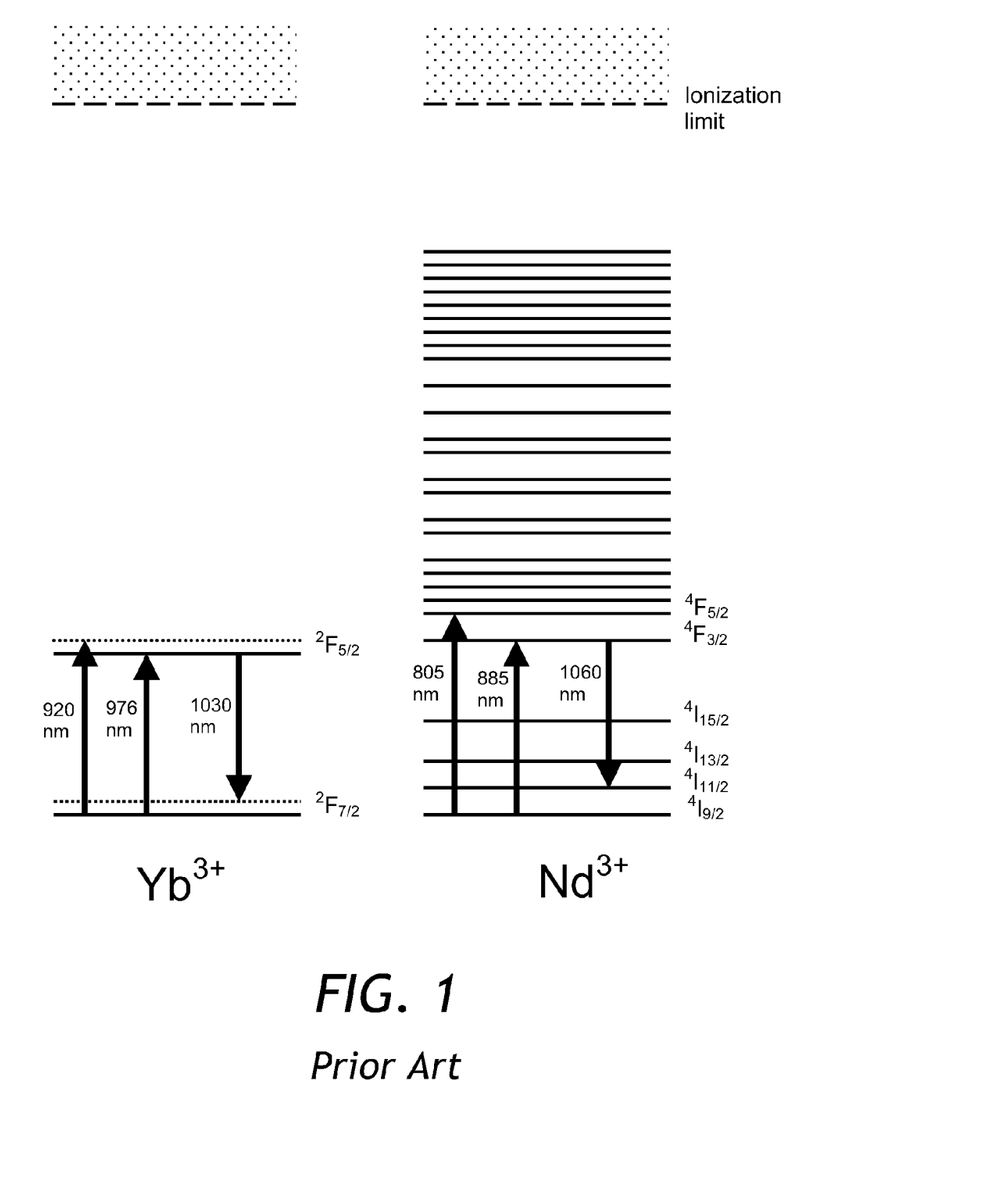
FIG. 1 is a side-by-side energy level diagram of $Yb^{3+}$ and $Nd^{3+}$ ions.

(b) $Yb^{3+}$ fiber lasers can utilize higher doping levels than $Nd^{3+}$. Referring to FIG. 1, $Yb^{3+}$ and $Nd^{3+}$ energy level structures are shown side-by-side. It is seen that $Yb^{3+}$ has only two energy-level manifolds, the $^5F_{5/2}$ and the $^5F_{7/2}$, which inherently avoids multi-level parasitic processes such as concentration quenching, excited-state absorption, and energy-transfer up-conversion. These parasitic processes can affect $Nd^{3+}$ having many more energy levels, the $^4I_{9/2}$ to $^4I_{15/2}$, $^4F_{5/2}$, and the $^4F_{3/2}$. Because these processes are correlated with rare-earth doping concentration, $Nd^{3+}$ is typically doped at lower concentrations in silica fiber than $Yb^{3+}$, resulting in reduced fiber lengths as well as further efficiency advantages for $Yb^{3+}$.

(c) $Yb^{3+}$ has an excited-state lifetime of approximately 1 ms, compared to approximately 0.25 ms for $Nd^{3+}$, which results in further efficiency advantages for $Yb^{3+}$.

(d) $Yb^{3+}$ can amplify light across a wider wavelength spectrum, extending from 1030 nm up to 1140 nm, whereas $Nd^{3+}$ typically amplifies from 1050 nm up to 1120 nm. The result is that $Yb^{3+}$ can support shorter pulse durations than $Nd^{3+}$ for ultrashort pulse applications, and can also be tuned over a wider output spectrum.

(e) $Yb^{3+}$ has a higher saturation fluence than $Nd^{3+}$, with the result that higher pulse energies can be generated by $Yb^{3+}$.

(f) The 920 nm and 976 nm pump bands of $Yb^{3+}$ are superior to the 805 nm and 885 nm pump bands of $Nd^{3+}$ from the standpoint of laser diode technology, as 900-980 nm laser diodes are currently more powerful and reliable than 800-890 nm diodes.

For these reasons, since about 1996, most of the activity in double-clad fiber lasers and amplifiers for operation in the 1030-1080 nm wavelength band has revolved around $Yb^{3+}$-doped devices, and almost none has occurred in $Nd^{3+}$-doped devices. The main remaining application in which $Nd^{3+}$-doped fiber devices are occasionally used today is for amplification in the 920 nm wavelength band, where $Yb^{3+}$ does not have a lasing transition. $Yb^{3+}$-doped fibers and fiber lasers are now available for sale from numerous companies, including Nufern of East Granby, Conn., and IPG Photonics of Oxford, Mass.

Fiber lasers and amplifiers have been developed since 1996 to generate increasingly high levels of average power and, for pulsed lasers, increasingly high levels of peak power. As a result, optical power density in the fiber has increased dramatically, leading to problems with optical damage and optical nonlinearities. Fiber manufacturers have addressed these problems by increasing the diameter of the fiber core beyond the single mode cutoff. The larger core reduces nonlinearities and damage in two ways: it reduces the power density of the laser radiation, and it allows the use of a shorter fiber length, since the larger core can hold more dopant per unit length. Such fibers are typically called "Large-Mode-Area", or LMA, double-clad fibers and are characterized by having a core V-number, $V=(2\pi a NA)/\lambda$, of greater than about 4.0. Herein, a is the core radius, NA is the numerical aperture, and $\lambda$ is the lasing wavelength. Below the V-number of 4.0, any higher-order modes typically have very high loss.

It is often preferred for the laser output to be in a diffraction-limited beam, which requires the active optical fiber to be operated in a single spatial mode. Experimentally, it has been observed that it is possible to obtain near-single mode operation in fibers with V up to about 6.0, corresponding to a fiber core of 25 micrometers diameter and 0.08NA (numerical aperture). Such a fiber, with a typical $Yb^{3+}$ doping level of ~1% by weight, the pump wavelength of 976 nm, and the cladding diameter of 250 micrometers, can give efficient operation at fiber lengths as short as 2 m. LMA fibers have demonstrated peak output powers of over 200 kW in nanosecond pulses, albeit with severe pulse distortion and spectral broadening due to optical nonlinearities.

To achieve even higher power levels at a nearly single mode operation, the fiber diameter needs to be further increased. To reduce nonlinearities and to improve reliability, the fiber length needs to be decreased. Several techniques have been developed to increase the core diameter and shorten the fiber further, while maintaining near-single-mode operation. The common features of these fibers, henceforth referred to as Very Large Mode Area (VLMA) fibers, are the $Yb^{3+}$-doped core diameter of greater than about 25 micrometers, the cladding diameter in the range from 100 micrometers to about 400 micrometers (typically determined by the brightness of the pump), and the fiber length of less than about 2 m.

One such VLMA fiber structure is disclosed by Limpert et al. in an article entitled "*High-Power Rod-Type Photonic Crystal Fiber Laser*", published in Optics Express, Vol. 13, No. 4, 21 Feb. 2005, p. 1055-1058. NKT Photonics of Birkerod, Denmark, manufactures VLMA fibers of this type. In these fibers, the $Yb^{3+}$-doped core is typically 40-100 micrometers in diameter, and the NA of the core is made very low (~0.03 or less) such that all core modes other than the fundamental mode are either cut off or have very high loss, so that only the fundamental mode is propagated. The core can be defined either by a small refractive index difference between the core and cladding materials, or by a lattice of small air holes in the cladding that create an effective refractive index difference, or both. Similarly, the pump guide can be defined by either a refractive index difference or by a lattice of air holes creating an effective refractive index difference. With such a low core NA, if the fiber is bent to any significant extent, even the fundamental mode will suffer distortion and bending loss. Therefore, the fiber is fabricated with a thick layer of silica outside the pump-guiding region to give a diameter on the order of 1 mm or more, and this stiff fiber is used as a straight rod. Typically, laser form factor is an important consideration for laser users, and so a laser system that houses a straight rod fiber of length greater than about 1 m could be unattractive. However, thanks to the large core diameter in the rod-type fiber, the pump absorption coefficient for $Yb^{3+}$ can be over ~10 dB/m in such a rod fiber, and lengths of 1 m or less can give efficient pump absorption in low-gain applications.

Another VLMA technique is embodied in the chirally-coupled core fiber disclosed by Galvanauskas in U.S. Pat. No. 7,424,193. In this technique, the $Yb^{3+}$-doped fiber core is a primary core made to have a secondary, smaller core wrapped helically around the primary one. The primary core has a diameter and NA selected so that the core is nominally multimode (V>4.0), but the helically wrapped secondary core is constructed to cause preferential loss for one or more of the higher-order modes, so that the fundamental mode experiences higher net gain than the other modes and thus prevails. Typically this technique would be incorporated in a double-clad structure to enable straightforward coupling of pump light at high power levels.

Yet another VLMA technique is embodied in a leakage-channel fiber disclosed by Dong et al. in U.S. Pat. No. 7,787,729. Similar to the chirally-coupled core fiber, this technique utilizes a nominally multimode core along with structural elements that cause preferential loss for one or more of the higher-order modes, and typically it would also be incorporated in a double-clad structure. In this technique, the signal light being amplified may not reside in a true fundamental mode of the structure, but rather in a so-called "leaky mode" that is confined by the structural elements in the first cladding and that remains relatively stable over the length of the device.

As expected, given the benefits of $Yb^{3+}$ doping over $Nd^{3+}$ as listed above, all known work using these VLMA techniques in the 1030-1080 nm wavelength band to date has used $Yb^{3+}$-doped fibers. However, because the parameter space with VLMA fibers is significantly different than with previous fibers, new issues must be considered.

Specifically, Limpert et al. in an article entitled "*High Repetition Rate Gigawatt Peak Power Fiber Laser Systems: Challenges, Design, and Experiment*", IEEE J. Selected Topics in Quantum Electronics, Vol. 15, January/February 2009, p. 159-169 (see section III: Gain Limitations in Short Low-NL Fibers and Consequences) discussed that in order to achieve useful levels of gain in a $Yb^{3+}$-doped VLMA laser or amplifier, much higher levels of inversion must be created than in conventional fiber lasers or amplifiers. These very high inversion levels deplete the laser ground state, reducing the population of $Yb^{3+}$ ions available for absorbing pump photons, thereby allowing a potentially large fraction of the pump power to travel unabsorbed through the fiber and reducing the conversion efficiency. If resonant pumping directly into the upper laser level is used, for example 976 nm pumping in $Yb^{3+}$, then this effect is worsened, because some of the pump photons will stimulate downward transitions of the existing inversion instead of being absorbed. These two related problems are collectively referred to as bleaching of the pump transition. Additionally, the inventor has observed, also in agreement with other workers, that the high inversion levels can cause rapid photodarkening of $Yb^{3+}$, in some cases causing the device to become inoperable within minutes.

A solution to the problem of pump bleaching, as explained by Limpert et al. in the above cited article, is to decrease the operating gain, and to increase the length of the fiber such that at the operating gain level, the fiber has adequate length to absorb the desired fraction of the input pump power. This solution has several drawbacks. First, typically the gain will be lower than it otherwise could have been, thus requiring more pre-amplification stages and thus higher cost. Second, since the pump absorption is dependent on the inversion, at low gains, all of the pump is absorbed in a short length of the fiber, while at higher inversions, not all the desired pump is absorbed, possibly causing problems with the transmitted pump light damaging downstream components. This can be particularly dangerous in transient operation, for example in an amplifier at a time between pulses, when the inversion can build up sharply and suddenly induce pump transparency in the gain medium. Third, depending on the specifics of the implementation, the additional fiber length may cause increased nonlinearities, partly undoing the benefits of using a VLMA technique. Fourth, depending on the pump configuration, there can still be regions of the fiber where the inversion is very high, and therefore photodarkening can take place in those regions.

The prior art is lacking a low-cost, low-nonlinearity solution to the problems of pump bleaching and photodarkening in VLMA active optical waveguides. It is an objective of the invention to provide such a solution.

SUMMARY OF THE INVENTION

The inventive solution to the problem is to replace the $Yb^{3+}$ dopant in devices operating in the 1050-1120 nm range with $Nd^{3+}$. This approach contradicts 15 years of "conventional wisdom" that $Yb^{3+}$ is the superior dopant to $Nd^{3+}$. While the aforementioned benefits of $Yb^{3+}$ as a dopant remain valid, in the regime of VLMA waveguides they are outweighed by advantages of $Nd^{3+}$ with respect to pump bleaching and photodarkening. It have been discovered that, for the desired short fiber lengths of <2 m and high pump absorption of at least 3 dB/m, $Nd^{3+}$ operates under much lower inversion levels than $Yb^{3+}$. As a result of these low inversion levels, $Nd^{3+}$ suffers from almost no pump bleaching or photodarkening.

In accordance with the invention there is provided an optical waveguide amplifier assembly comprising:

a signal source for providing signal light at a wavelength of between 1050 nm and 1120 nm; and an active optical waveguide coupled to the signal source, comprising:

a core for guiding the signal light, wherein the core is doped with neodymium ions at a concentration of at least 0.1% by weight;

a first cladding surrounding the core, for guiding pump light, wherein the first cladding has a refractive index structure to confine the signal light within the core, wherein in operation, the signal light is amplified by the neodymium ions when a population inversion is created in the neodymium ions upon absorption of the pump light; and a second cladding surrounding the first cladding, having an effective refractive index lower than an effective refractive index of the first cladding, for confining the pump light to the first cladding and the core;

wherein the refractive index structure of the first cladding is such that a fundamental spatial mode of the signal light has an area of at least 500 square micrometers.

In accordance with another aspect of the invention there is further provided an optical oscillator comprising:

an active optical waveguide comprising:

a core for guiding the signal light, wherein the core is doped with neodymium ions at a concentration of at least 0.1% by weight;

a first cladding surrounding the core, for guiding pump light, wherein the first cladding has a refractive index structure to confine the signal light within the core, wherein in operation, the signal light is amplified by the neodymium ions when a population inversion is created in the neodymium ions upon absorption of the pump light; and a second cladding surrounding the first cladding, having an effective refractive index lower than an effective refractive index of the first cladding, for confining the pump light to the first cladding and the core;

wherein the refractive index structure of the first cladding is such that a fundamental spatial mode of the signal light has an area of at least 500 square micrometers; and a wavelength selective optical feedback element coupled to the active optical waveguide, for feeding amplified signal light at a wavelength of between 1050 nm and 1120 nm back into the active optical waveguide.

In accordance with another aspect of the invention there is further provided a method of amplifying an optical signal at a wavelength of between 1050 nm and 1120 nm, comprising:

(a) providing an optical waveguide comprising:

a core for guiding the signal light, wherein the core is doped with neodymium ions at a concentration of at least 0.1% by weight;

a first cladding surrounding the core, for guiding pump light, wherein the first cladding has a refractive index structure to confine the signal light within the core; and a second cladding surrounding the first cladding, having an effective refractive index lower than an effective refractive index of the first cladding, for confining the pump light to the first cladding and the core; and (b) pumping the first cladding of the optical waveguide with the pump light at a wavelength of 795 nm to 815 nm or 883 nm to 887 nm, to create a population inversion in the neodymium ions upon absorption of the pump light and to amplify the optical signal by the neodymium ions;

wherein step (a) includes selecting a refractive index structure of the first cladding so that a fundamental spatial mode of the guided optical signal has an area of at least 500 square micrometers.

In accordance with yet another aspect of the invention there is provided use of a neodymium doped VLMA optical waveguide to amplify signal light at a wavelength of between 1050 nm and 1120 nm, the VLMA optical waveguide comprising:

a core for guiding the signal light, wherein the core is doped with neodymium ions at a concentration of at least 0.1% by weight;

a first cladding for guiding pump light, surrounding the core, wherein the first cladding has a refractive index structure to confine the signal light within the core, wherein in operation, the signal light is amplified by the doping material when a population inversion is created in the doping material upon absorption of the pump light; and a second cladding surrounding the first cladding, having an effective refractive index lower than an effective refractive index of the first cladding, for confining the pump light to the first cladding and the core;

wherein the refractive index structure of the first cladding is selected so that a fundamental spatial mode of the signal light has an area of at least 500 square micrometers.

BRIEF DESCRIPTION OF THE DRAWINGS

Exemplary embodiments will now be described in conjunction with the drawings, in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Figure 2:
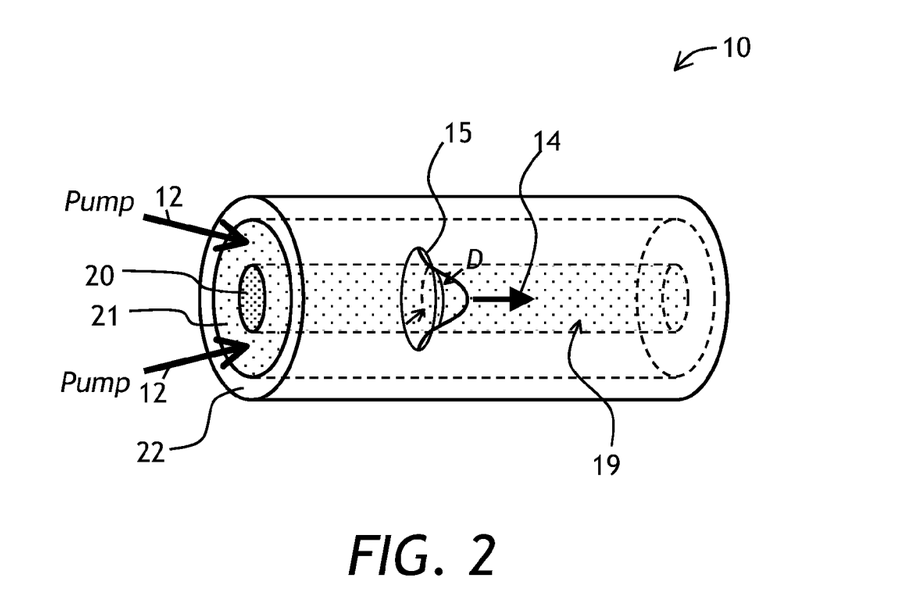
FIG. 2 is a schematic view of a VLMA waveguide of the invention.

Referring to FIG. 2, a Very Large Mode Area (VLMA) optical waveguide 10 of the invention includes a core 20 doped with neodymium (Nd) ions 19. A first cladding 21, having a refractive index $n_1$ lower than the refractive index $n_0$ of the core 20, surrounds the core 20. A second cladding 22, having a refractive index $n_2$ lower than the refractive index $n_1$ of the first cladding 21, surrounds the first cladding 21.

In operation, pump light 12 is coupled into the first cladding 21, which guides the pump light 12. The second cladding 22 confines the pump light 12 to the first cladding 21 (and the core 20, of course). The pump light 12 is absorbed by the Nd ions 19 in the core 20, creating a population inversion in the Nd ions 19, which amplify signal light 14 through a phenomenon of stimulated emission. The difference of the refractive indices of the core and the first cladding $n_0-n_1$, and a diameter of the core 20, are such that a fundamental spatial mode 15 of the signal light 14 guided by the core 20 has an area of at least 500 square micrometers, which corresponds to a $1/e^2$ (by intensity) diameter D of the fundamental spatial mode 15 of at least 25 micrometers. A person skilled in the art can calculate differences $n_0-n_1$ of the refractive indices of the core 20 and the first cladding 21, and corresponding diameters of the core 20, that would yield the required fundamental spatial more area of at least 500 square micrometers. By way of example, the difference $n_0-n_1$ of the refractive indices of the core 20 and the first cladding 21 can be between 0.01 and 0.06, and the core diameter can be at least 25 micrometers.

Although the signal light 14 and the pump light 12 are shown in FIG. 2 to co-propagate, counter-propagating pumping is also possible.

The core 20 and the first cladding 21 are preferably made of fused silica doped with suitable dopants. The second cladding 22 can be made of fused silica or a polymer such as a fluoroacrylate. Low-index fluoroacrylate claddings provide a higher difference of the refractive indices $n_1-n_2$ of the first and the second claddings 21 and 22, respectively, than a silica glass cladding. Larger refractive index differences make it easier to couple the pump light 21 to the first cladding 21; however, at high pump power levels polymer materials can burn, and thus a silica cladding can be preferable at high pump power levels. Air or even vacuum cladding 22 is conceivable, as in so-called holey fibers or photonic-crystal fibers. In other words, the "inner waveguide" formed by the core 20 and the first cladding 21 can be placed in air having refractive index n=1. In case of the air cladding 22, a special care must be taken to hold the "inner waveguide" in place without leaking too much of the pump light 12 from the first cladding 21.

The claddings 21, 22 may be formed by a plurality of air holes or other cladding features in a photonic crystal fiber, a chirally-coupled core fiber, a leakage-channel fiber, or a similar structure known in the art. When the claddings 21, 22 are structured claddings, the first and/or the second claddings 21 and 22, respectively, can be defined by the air-hole structure or other cladding features. The first and/or the second structured claddings 21 and 22 can be characterized by corresponding effective refractive indices $n_1^{EFF}$ and $n_2^{EFF}$, respectively. To confine the pump light 12 to the first cladding 21 and the core 20, the effective refractive index $n_2^{EFF}$ of the second cladding 22 needs to be lower than the effective refractive index $n_1^{EFF}$ of the first cladding 21: $n_2^{EFF} < n_1^{EFF}$. The refractive index structure of the first cladding 21 has to be selected so as to confine the signal light 14 within the core 20, such that the fundamental spatial mode 15 of the signal light 14 has an area of at least 500 square micrometers. A variety of the refractive index structures of the first cladding 21 can be used for this purpose, including the solid first cladding 21 shown in FIG. 2, an air hole structure as in a photonic crystal fiber, and/or a leakage channel structure. Selecting an appropriate refractive index structure of the first cladding 21 to achieve a pre-defined diameter D of the fundamental mode 15 is well known in the art.

Figure 3:
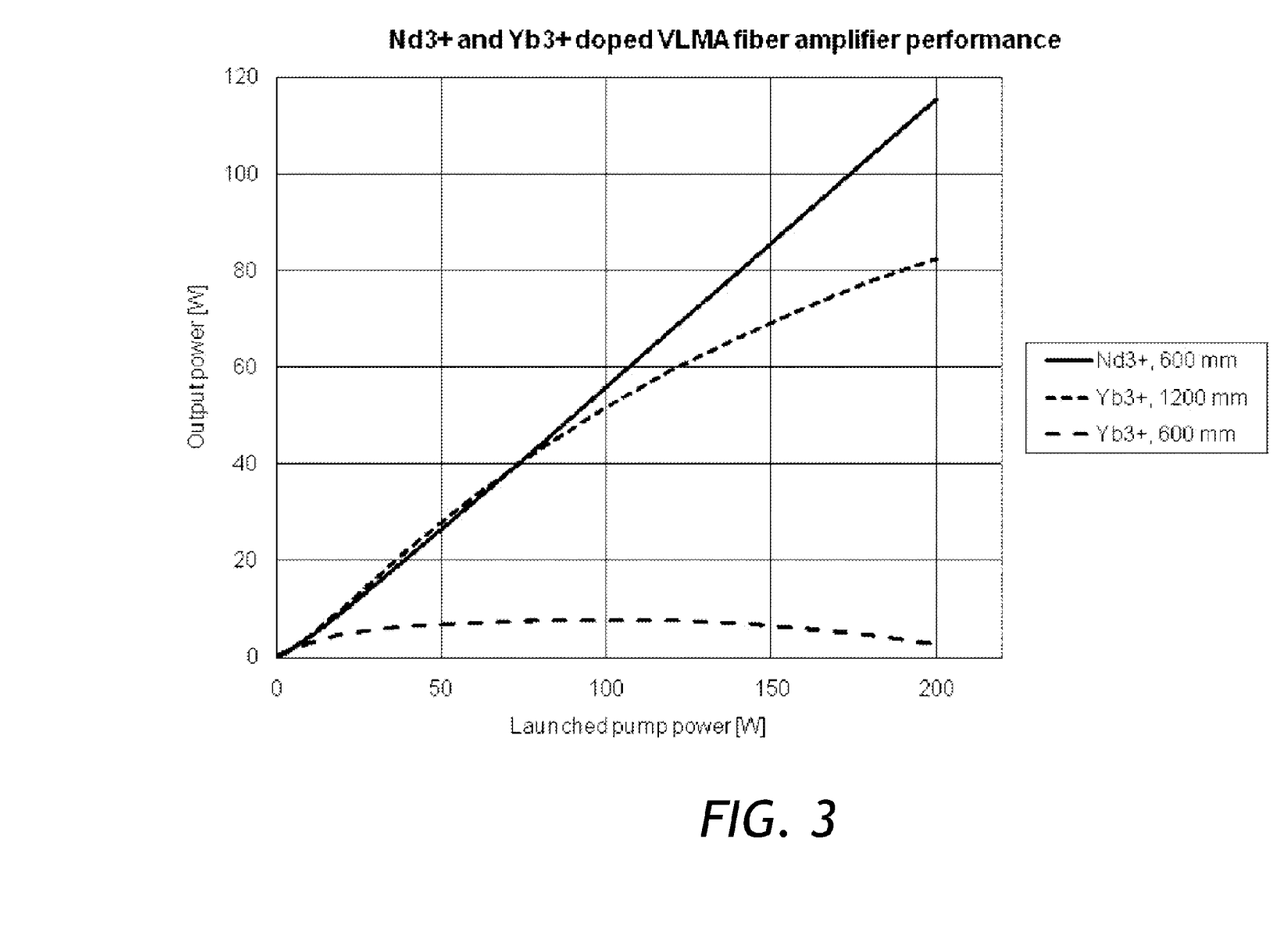
FIG. 3 is a diagram of efficiency plots for $Yb^{3+}$ and $Nd^{3+}$ doped fiber amplifiers.

To verify advantages of $Nd^{3+}$ doping of the VLMA active optical fiber 10, as compared to $Yb^{3+}$ doping, a numerical simulation was performed. Turning to FIG. 3, the output optical power is plotted as a function of launched pump power for three VLMA optical fibers: 1) $Nd^{3+}$ doped, 600 mm long, shown with a solid line; 2) $Yb^{3+}$ doped, 1200 mm long, shown with a densely dashed line; and 3) $Yb^{3+}$ doped, 600 mm long, shown with a more rarely dashed line. In all three cases, the modeled VLMA optical fiber was a silica glass fiber having a 60 micrometers diameter core doped at 0.5% by weight; a 200 micrometers diameter first cladding; the signal light at the wavelength of 1064 nm; the input signal power of 0.5 W; the pulse repetition rate of 300 kHz, and the pump wavelengths of 976 nm and 805 nm for $Yb^{3+}$ and $Nd^{3+}$, respectively.

These conditions are similar to those modeled by Limpert et al. for Yb doped fibers and reported in the article entitled "*High Repetition Rate Gigawatt Peak Power Fiber Laser Systems Challenges, Design, and Experiment*", published in IEEE J. Selected Topics in Quantum Electronics, Vol. 15, January/February 2009, p. 159-169 (in particular, FIGS. 6, 7, and accompanying text). The output optical power dependence calculated by Limpert et al. for $Yb^{3+}$-doped VLMA optical fiber is similar to that shown in FIG. 3. At the 600 mm fiber length of the $Yb^{3+}$-doped VLMA optical fiber, very little useful output power is generated, because the pump transition is highly bleached. There is significant improvement in doubling the length to 1200 mm, but with input signal levels less than 1 W, the conversion still falls short of optimal, and it is evident that the conversion is worsening with increasing pump power, which is a clear sign of pump bleaching.

By contrast, with $Nd^{3+}$ at 600 mm length, there is no hint of pump bleaching. The output power remains linear in the pump power as the laser is turned up to a gain of as high as 24 dB. It can be seen that, in spite of the lower inherent quantum yield of $Nd^{3+}$ than $Yb^{3+}$, the net efficiency of the 600 mm long $Nd^{3+}$ doped fiber at high gain is significantly better than that of a $Yb^{3+}$ fiber of twice the length. Modeling has demonstrated similar benefits in the VLMA waveguide 10 of up to 2 m in length.

The better photodarkening performance of $Nd^{3+}$ doping over $Yb^{3+}$ doping can be understood as follows. The photodarkening rates for rare earth doping materials in silica glasses have been observed to depend on a high exponent of the inversion density. By way of example, Koponen et al. in an article entitled "*Combined Photodarkening and Thermal Bleaching Measurement of an Ytterbium-Doped Fiber*", Proc. SPIE, Vol. 7195, p. 7195D-1 to 7195D-7, 2009, teaches that the exponent has been measured by various authors to be between 4 and 7. As mentioned above, the inversion density in $Nd^{3+}$ turns out to be much lower than in $Yb^{3+}$. In the simulated example presented in FIG. 3, the inversion in the 600 mm $Nd^{3+}$ fiber was found to be 13.4%, whereas the inversion in the 1200 mm $Yb^{3+}$ fiber was found to be 44.0%. Given that the photodarkening rate is proportional to a power between 4 and 7 of this inversion density, it follows that the photodarkening rate in $Nd^{3+}$ can be expected to be between 0.02% and 0.9% that of $Yb^{3+}$, which is, clearly, a strong advantage. The inventor's experiments have shown an absence of detectable photodarkening in $Nd^{3+}$ at a concentration of the $Nd^{3+}$ ions of at least 0.7% by weight, at a length of up to 600 mm, and at optical gain values of up to 25 dB. Generally, $Nd^{3+}$ doping is particularly advantageous in high-gain conditions.

Regarding specific levels of $Nd^{3+}$ doping and the length of the VLMA waveguide 10, it has been found both experimentally and by simulation that VLMA waveguide 10 having the core 20 doped at a concentration of at least 0.1% by weight can be used in optical amplifiers and oscillators (lasers). More preferably, in order to ensure a reasonable level of pump absorption efficiency in a typical waveguide design and practical length, a concentration of at least 0.3% by weight should be used. Preferably, the length of the VLMA waveguide 10 should not exceed 2 m. Reducing the length of the VLMA waveguide 10 is critical to suppress nonlinearities, which typically scale with length. Additionally, since in some designs the VLMA waveguide 10 is rigid and straight, it is important to minimize the length in order to achieve a commercially acceptable form factor for the product, commercial lasers typically being no longer than 1 to 2 m. The short lengths of the $Nd^{3+}$ doped VLMA waveguide 10 are enabled by high optical gains achievable with little or no pump bleaching/photodarkening.

A good indicator of a desired doping level of the VLMA waveguide 10 is pump absorption per unit length of the VLMA waveguide 10. The inventor's own experiments and calculations indicated that $Nd^{3+}$ doping concentrations for 3 dB/m attenuation of the pump light 12 at the wavelength of 795 to 815 nm or 883 to 887 nm will work well in amplifiers and oscillator applications. The $Nd^{3+}$ doping concentration can be further increased to achieve 10 dB/m attenuation of the pump light 12, in which case the length of the VLMA waveguide 10 should be preferably reduced to 0.6 m or even less. The above pump wavelength ranges of 795 to 815 nm and 883 to 887 nm correspond to the resonance transition $^4I_{9/2}$-$^4F_{5/2}$ and $^4I_{9/2}$-$^4F_{3/2}$, respectively, shown in FIG. 1. Although the latter resonance is weaker, it has a higher quantum yield and therefore a potentially higher efficiency. Also, pump laser diodes are commercially available at higher powers and brightnesses at 880-890 nm than at 800-810 nm.

In addition to the $Nd^{3+}$ dopant, the core 20 can comprise co-dopant ions such as Al, Ge, P, F, and B to reduce pump light losses, improve quantum efficiency, and/or balance the refractive index $n_0$ of the core 20.

Figure 4A:
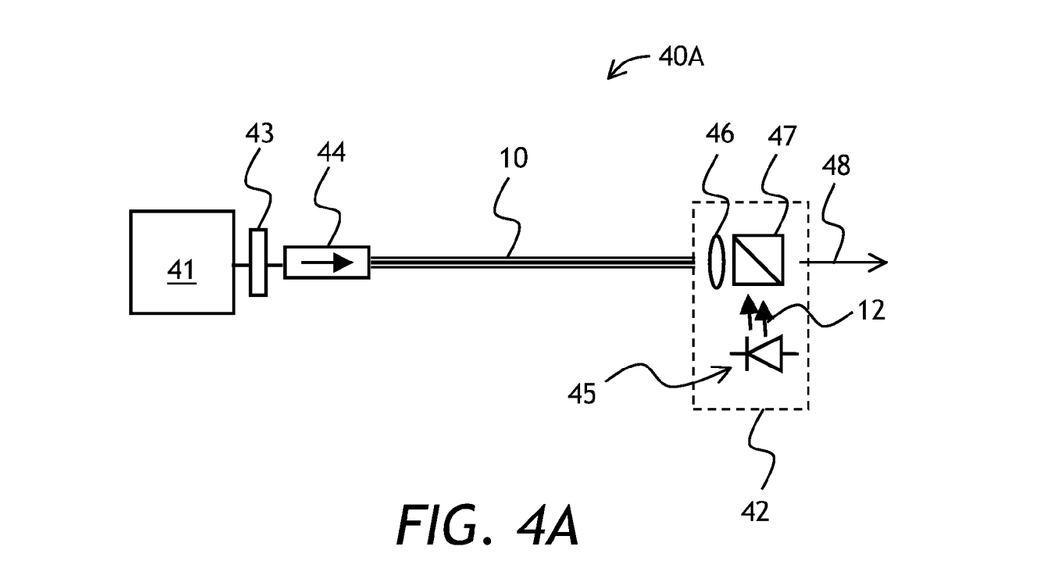
FIGS. 4A and 4B are schematic views of an optical amplifier assembly and an optical oscillator of the invention, respectively.
Figure 4B:
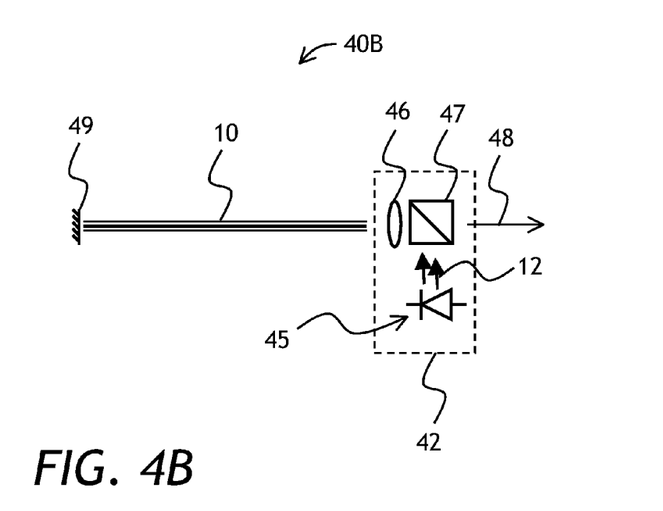

The above described variants of $Nd^{3+}$ doped VLMA waveguide 10 can be used in an amplifier and an oscillator of the invention shown in FIGS. 4A and 4B, respectively. Referring specifically to FIG. 4A with further reference to FIG. 2, an optical waveguide amplifier 40A includes a signal source 41, the VLMA 10 coupled to the signal source 41, and a pump module 42 coupled to the VLMA waveguide 10 at the other end of the VLMA waveguide 10. The signal source 41 includes an optional spectral filter 43 for filtering light at a wavelength of between 1050 nm and 1120 nm, coupled to an optical isolator 44. The pump module 42 includes a laser diode 45, a dichroic beamsplitter 47, and a focusing lens 46. The signal source 41 can include a seed laser, an optical pre-amplifier, etc.

In operation, the laser diode 45 emits the pump light 12, which is reflected by the dichroic beamsplitter 47, focused by the lens 46, and is coupled into the first cladding 21 of the VLMA waveguide 10. The pump light 12 is absorbed by the Nd ions 19, creating the population inversion in the Nd ions 19. The signal light 14 from the light source 41 is filtered by the filter 43, passes through the optical isolator 44, and is coupled into the core 20 of the VLMA waveguide 10. The signal light 14 is amplified in the core 20, collimated by the lens 46, passes through the dichroic beamsplitter 47, and exits the amplifier 40A as a collimated beam 48.

Referring now to FIG. 4B with further reference to FIG. 2, an optical oscillator 40B includes the VLMA waveguide 10, a reflector 49 coupled to the VLMA 10, and the pump module 42 coupled to the VLMA waveguide 10 on the other end. In operation, the pump module 42 pumps the first cladding 21 of the VLMA waveguide 10, resulting in amplifying of spontaneous emission in the core of the VLMA waveguide 10. The reflector 49 feeds the amplified signal light back into the VLMA waveguide 10. A vertical surface of the beamsplitter 47 acts as a partial dichroic reflector for the signal light at the wavelength of 1050 nm to 1120 nm. Of course, any other wavelength selective optical feedback element can be used in place of the reflector 49/beamsplitter 47, as is well known in the art.

Figure 5:
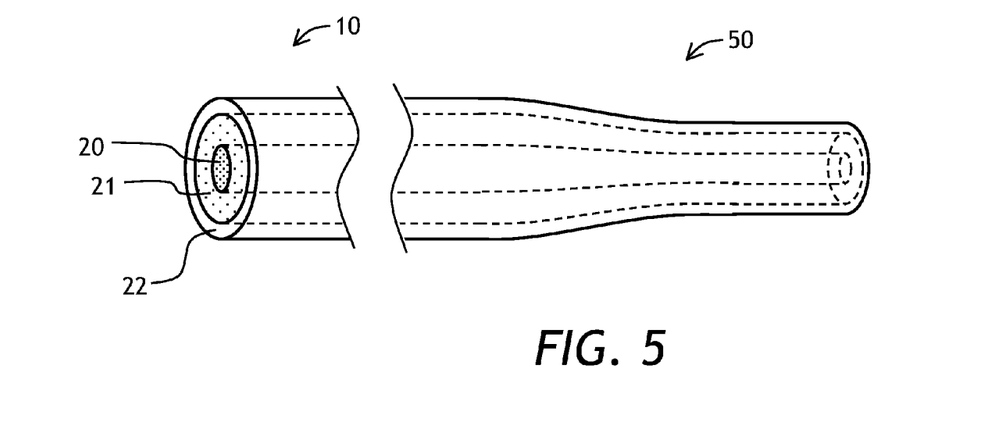
FIG. 5 is a schematic view of a VLMA waveguide of the invention having a tapered section.

Turning to FIG. 5 with further reference to FIGS. 4A and 4B, a tapered-down section 50 can be spliced onto the VLMA waveguide 10 to improve the quality of the output beam 48. The function of the tapered-down section 50 is to create an optical loss for a non-fundamental spatial mode of the signal light 14 propagating in the core 20. This places the fundamental spatial mode 15 at an advantage as compared to non-fundamental spatial modes, ensuring a near single-mode performance of a laser or an amplifier using the VLMA 10. The near-single mode performance, represented by a $M^2$ parameter approaching unity, results in a nearly diffraction-limited output optical beam—a quality sought for in many fiber lasers and amplifiers. The tapered-down section 50 can also be obtained by a controllable heating and stretching (tapering) of the VLMA waveguide 10. The tapered-down section 50 of the VLMA waveguide 10 can be used in both the optical amplifier 40A and the optical oscillator 40B.

Figure 6:
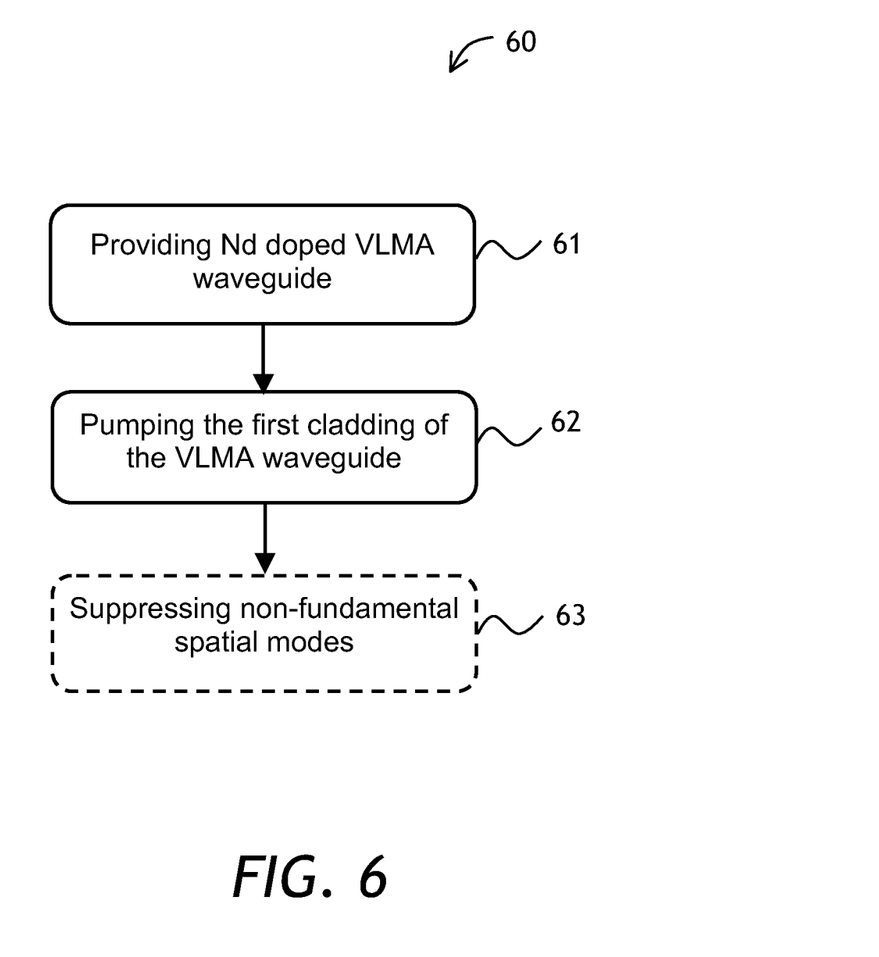
FIG. 6 is a diagram of a method of amplifying an optical signal using a VLMA waveguide of the invention.

Referring now to FIG. 6, a method 60 of amplifying the optical signal 14 is presented. In a step 51, the VLMA waveguide 10 is provided. In a step 52, the first cladding 21 of the VLMA waveguide 10 is pumped with the pump light 12, to create a population inversion in the Nd ions 19 upon absorption of the pump light 12 and to amplify the optical signal 14 by the Nd ions 19. The first cladding 21 is preferably pumped at wavelengths of between 883 and 887 nm and/or at wavelengths of between 795 and 815 nm, to achieve pump absorption of at least 3 dB/m, or even at least 10 dB/m.

The method 60 includes an optional step 53, in which non-fundamental, or higher-order, spatial modes of the guided optical signal 14 are suppressed. By way of example, the taper 50 of FIG. 5 can be used to suppress the non-fundamental modes. Other means for suppressing higher-order spatial modes can include bending the VLMA waveguide 10; mode filtering; and gain-guiding the fundamental mode 15.

The foregoing description outlines use of the neodymium doped VLMA waveguide 10 to amplify the signal light 14 at the wavelength of between 1050 nm and 1120 nm. The core 20 of the VLMA waveguide 10 is doped at the concentration of at least 0.1% by weight. The specific doping concentration may depend on the application, for example the concentration of at least 0.3% by weight may be preferable. A guideline to be followed for selecting the doping concentration is to aim at least 3 dB/m, or even at least 10 dB/m absorption of the pump light 12 at the wavelengths of between 883 and 887 nm and/or at wavelengths of between 795 and 815 nm.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An optical waveguide amplifier assembly comprising:
   a signal source for providing signal light at a wavelength of between 1050 nm and 1120 nm; and
   an active optical waveguide coupled to the signal source, the active optical waveguide comprising:
   a core for guiding the signal light, wherein the core is doped with neodymium ions at a concentration of at least 0.1% by weight;
   a first cladding surrounding the core, for guiding pump light, wherein the first cladding has a refractive index structure to confine the signal light within the core, wherein in operation, the signal light is amplified by the neodymium ions when a population inversion is created in the neodymium ions upon absorption of the pump light; and a second cladding surrounding the first cladding, having an effective refractive index lower than an effective refractive index of the first cladding, for confining the pump light to the first cladding and the core;

wherein the refractive index structure of the first cladding is such that a fundamental spatial mode of the signal light has an area of at least 500 square micrometers;

wherein the neodymium ions in the core have a concentration to provide a net optical absorption of at least 3 dB/m for the pump light at a wavelength of 795 to 815 nm or 883 to 887 nm.

2. The amplifier assembly of claim 1, wherein the active optical waveguide has a length of no greater than 2 m.

3. The amplifier assembly of claim 1, wherein the neodymium ions in the core have a concentration to provide a net optical absorption of at least 10 dB/m for the pump light at the wavelength of 795 to 815 nm or 883 to 887 nm.

4. The amplifier assembly of claim 1, wherein the core is doped with neodymium ions at the concentration of at least 0.3% by weight.

5. The amplifier assembly of claim 1, wherein the first cladding is a solid cladding.

6. The amplifier assembly of claim 5, wherein a difference between a refractive index of the core and a refractive index of the solid first cladding is between 0.01 and 0.06, and wherein the core diameter is at least 25 micrometers.

7. The amplifier assembly of claim 1, wherein the second cladding comprises a material selected from the group consisting of air, fused silica, and polymer.

8. The amplifier assembly of claim 1, wherein the core comprises co-dopant ions selected from the group consisting of Al, Ge, P, F, and B.

9. The amplifier assembly of claim 1, wherein the active optical waveguide comprises a tapered-down section for creating an optical loss for a non-fundamental spatial mode of the signal light propagating in the core.

10. A method of amplifying an optical signal at a wavelength of between 1050 nm and 1120 nm, comprising:
(a) providing an optical waveguide comprising:
a core for guiding the optical signal, wherein the core is doped with neodymium ions at a concentration of at least 0.1% by weight;
a first cladding surrounding the core, for guiding pump light, wherein the first cladding has a refractive index structure to confine the signal light within the core; and
a second cladding surrounding the first cladding, having an effective refractive index lower than an effective refractive index of the first cladding, for confining the pump light to the first cladding and the core, wherein the concentration of the neodymium ions in the core is selected so as to provide a net optical absorption of the pump light of at least 3 dB/m; and
(b) pumping the first cladding of the optical waveguide with the pump light at a wavelength of 795 to 815 nm or 883 to 887 nm, to create a population inversion in the neodymium ions upon absorption of the pump light and to amplify the optical signal by the neodymium ions;
wherein step (a) includes selecting the refractive index structure of the first cladding so that a fundamental spatial mode of the guided optical signal has an area of at least 500 square micrometers.

11. The method of claim 10, wherein step (a) further includes selecting the concentration of the neodymium ions in the core so as to provide a net optical absorption of the pump light of at least 10 dB/m.

12. The method of claim 10, further comprising
(c) suppressing non-fundamental spatial modes of the guided optical signal.

13. The optical waveguide amplifier assembly of claim 1, further comprising a pump source optically coupled to the active optical waveguide for providing the pump light a wavelength of 795 to 815 nm or 883 to 887 nm at a power level for operating the optical waveguide amplifier at a gain of at least 13 dB.

14. The method of claim 10, wherein in step (b), the first cladding of the optical waveguide is pumped at a power level for operating the optical waveguide at a gain of at least 13 dB.

15. The method of claim 14, wherein the active optical waveguide has a length of no greater than 2 m.

* * * * *